US 12,450,336 B2

United States Patent
Mathur

(10) Patent No.: US 12,450,336 B2
(45) Date of Patent: *Oct. 21, 2025

(54) SECURING OF SANDBOXED GENERATIVE AI MODELS

(71) Applicant: Snap Inc., Santa Monica, CA (US)

(72) Inventor: Dheeresh Pratap Mathur, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/496,683

(22) Filed: Oct. 27, 2023

(65) Prior Publication Data

US 2025/0139229 A1    May 1, 2025

(51) Int. Cl.
*G06F 21/00*    (2013.01)
*G06F 21/53*    (2013.01)
*G06N 3/0475*    (2023.01)

(52) U.S. Cl.
CPC ........... *G06F 21/53* (2013.01); *G06N 3/0475* (2023.01)

(58) Field of Classification Search
None
See application file for complete search history.

(56) References Cited

U.S. PATENT DOCUMENTS

| | | | |
|---|---|---|---|
| 8,224,796 B1* | 7/2012 | Shinde | G06F 16/162 707/821 |
| 12,210,667 B2 | 1/2025 | Sourov | |
| 12,236,535 B2 | 2/2025 | Kang et al. | |
| 12,272,014 B2 | 4/2025 | Alqadi et al. | |
| 2015/0143459 A1* | 5/2015 | Molnar | H04L 67/02 726/2 |
| 2016/0269376 A1* | 9/2016 | Goyal | H04L 63/04 |
| 2018/0189661 A1* | 7/2018 | Tatourian | H04W 4/38 |

(Continued)

FOREIGN PATENT DOCUMENTS

| WO | WO-2022139879 A1 | 6/2022 |
|---|---|---|
| WO | WO-2025090876 A1 | 5/2025 |

OTHER PUBLICATIONS

"International Application Serial No. PCT/US2024/052976, International Search Report mailed Jan. 7, 2025", 5 pgs.

(Continued)

*Primary Examiner* — Shin-Hon (Eric) Chen
(74) *Attorney, Agent, or Firm* — Schwegman Lundberg & Woessner, P.A.

(57) ABSTRACT

A generative artificial intelligence (AI) system includes a generative AI model configured to generate outputs based on a training data set. The AI system additionally includes a secure data vault system. The secure data vault system additionally includes a sandbox system storing the generative AI model and operatively coupled to the generative AI model to send inputs to generate the outputs from the generative AI model, wherein the sandbox system comprises an execution environment configured to restrict execution of the generative AI model to a predefined memory address range. The secure data vault system further includes a secure network service communicatively coupled to the sandbox system and configured to authenticate a connection to an external system and to download from the external system an update package for the generative AI model when the connection is authenticated.

19 Claims, 10 Drawing Sheets

(56) References Cited

U.S. PATENT DOCUMENTS

| | | | |
|---|---|---|---|
| 2019/0279114 A1 | 9/2019 | Deshpande et al. | |
| 2019/0392194 A1* | 12/2019 | Croxford | G06V 20/64 |
| 2021/0357496 A1* | 11/2021 | Lewis | H04L 67/53 |
| 2021/0397811 A1* | 12/2021 | Richter | H04N 21/42202 |
| 2022/0207840 A1 | 6/2022 | Cansizoglu et al. | |
| 2023/0094993 A1* | 3/2023 | Hwang | G06F 21/6254 726/26 |
| 2023/0119556 A1 | 4/2023 | Uprit | |
| 2023/0161887 A1* | 5/2023 | Albero | G06F 21/604 |
| 2023/0342487 A1* | 10/2023 | Joseph | G06V 40/166 |
| 2024/0061938 A1* | 2/2024 | Briongos | G06F 21/57 |
| 2024/0168565 A1 | 5/2024 | Stolzenberg et al. | |
| 2024/0248698 A1* | 7/2024 | Andrews | G06F 13/102 |
| 2024/0281519 A1* | 8/2024 | Almeida | G06F 21/6218 |
| 2024/0323320 A1* | 9/2024 | Butler | H04N 7/147 |
| 2025/0094563 A1* | 3/2025 | Lisherness | G06F 21/53 |
| 2025/0131674 A1* | 4/2025 | Polyakov | G06T 19/20 |

OTHER PUBLICATIONS

"International Application Serial No. PCT/US2024/052976, Written Opinion mailed Jan. 7, 2025", 6 pgs.

Njabulo, Mtetwa S, et al., "Secure Firmware Updates in the Internet of Things: A survey", International Multidisciplinary Information Technology and Engineering Conference (IMITEC), IEEE, (Nov. 21, 2019), 7 pgs.

Vaswani, Ashish, et al., "Attention Is All You Need", In Advances in Neural Information Processing Systems 30: Annual Conference on Neural Information Processing Systems, Long Beach, CA, USA, (Dec. 4, 2017), 11 pgs.

"International Application Serial No. PCT/US2024/052973, International Search Report mailed Jan. 3, 2025", 4 pgs.

"International Application Serial No. PCT/US2024/052973, Written Opinion mailed Jan. 3, 2025", 5 pgs.

"International Application Serial No. PCT/US2024/052979, International Search Report mailed Jan. 7, 2025", 5 pgs.

"International Application Serial No. PCT/US2024/052979, Written Opinion mailed Jan. 7, 2025", 5 pgs.

"International Application Serial No. PCT/US2024/052982, International Search Report mailed Jan. 7, 2025", 4 pgs.

"International Application Serial No. PCT/US2024/052982, Written Opinion mailed Jan. 7, 2025", 5 pgs.

"U.S. Appl. No. 18/496,080, Notice of Allowance mailed Jul. 11, 2025", 19 pgs.

"U.S. Appl. No. 18/496,703, Notice of Allowance mailed Jul. 1, 2025", 19 pgs.

"U.S. Appl. No. 18/496,718, Notice of Allowance mailed Aug. 13, 2025", 18 pgs.

\* cited by examiner

SECURING OF SANDBOXED GENERATIVE AI MODELS

BACKGROUND

Generative artificial intelligence (AI) include models that are used to generate new data points, such as responses to textual queries, that resemble examples in training datasets. Additionally, users increasingly share media content items such as electronic images and videos with each other. Users also increasingly utilize their mobile devices to communicate with each other using message programs.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Generative AI models are a class of artificial intelligence models designed to generate data, typically in the form of text, images, and/or audio based on training data. In some examples, the generative AI models are used to generate augmented reality (AR) and/or virtual reality (VR) content. Data, such as data provided via camera systems and microphones included in a variety of devices, such as mobile devices, is provided as input to the generative AI models. An AR and/or VR system then uses output generated via the generative AI models to add certain virtual content, such as images, video, audio, text, and so on, into a respective AR and/or VR environment. A device that supports AR experiences in any one of these approaches is referred to herein as an "AR device" and a device that supports VR experiences is referred to herein as a "VR device."

The techniques described herein provide for a secure data vault system to host the generative AI models. The secure data vault system is an isolated and secure environment within an operating system (OS), such as an AR OS. The secure data vault system maintains separation from user applications while enabling users/creators to maintain control over their data. The secure data vault system includes a "sandbox" with features that allow the user to execute certain computations (e.g., via the generative AI models) inside the sandbox for raw data and computed data. Raw data includes data incoming from cameras, microphones, and other sensors. The raw data is shared via a privileged region of the OS with the secure data vault system so that the secure data vault system can manage usage of the raw data. Computed data is data that either has been generated, for example, via the generative AI models, from the raw data or that has been generated without using the cameras, microphones, and other sensors. Raw data is kept within the secure data vault system while computed data is allowed to leave the secure data vault system subject to certain policy enforcements, as further described below.

In some embodiments, the secure data vault system is part of the OS but includes hardware components for providing isolation and trust. The secure data vault system also can apply the generative AI systems to provide for enhanced security and privacy. For example, certain AI models are trained to take the raw data as input and then output blurred images, video, and the like, to preserve privacy. For example, a user may be wearing the AR and/or VR device and inadvertently look at a credit card statement placed on a table. The AI models will then blur the credit card statement to preserve privacy.

Networked Computing Environment

Figure 1:
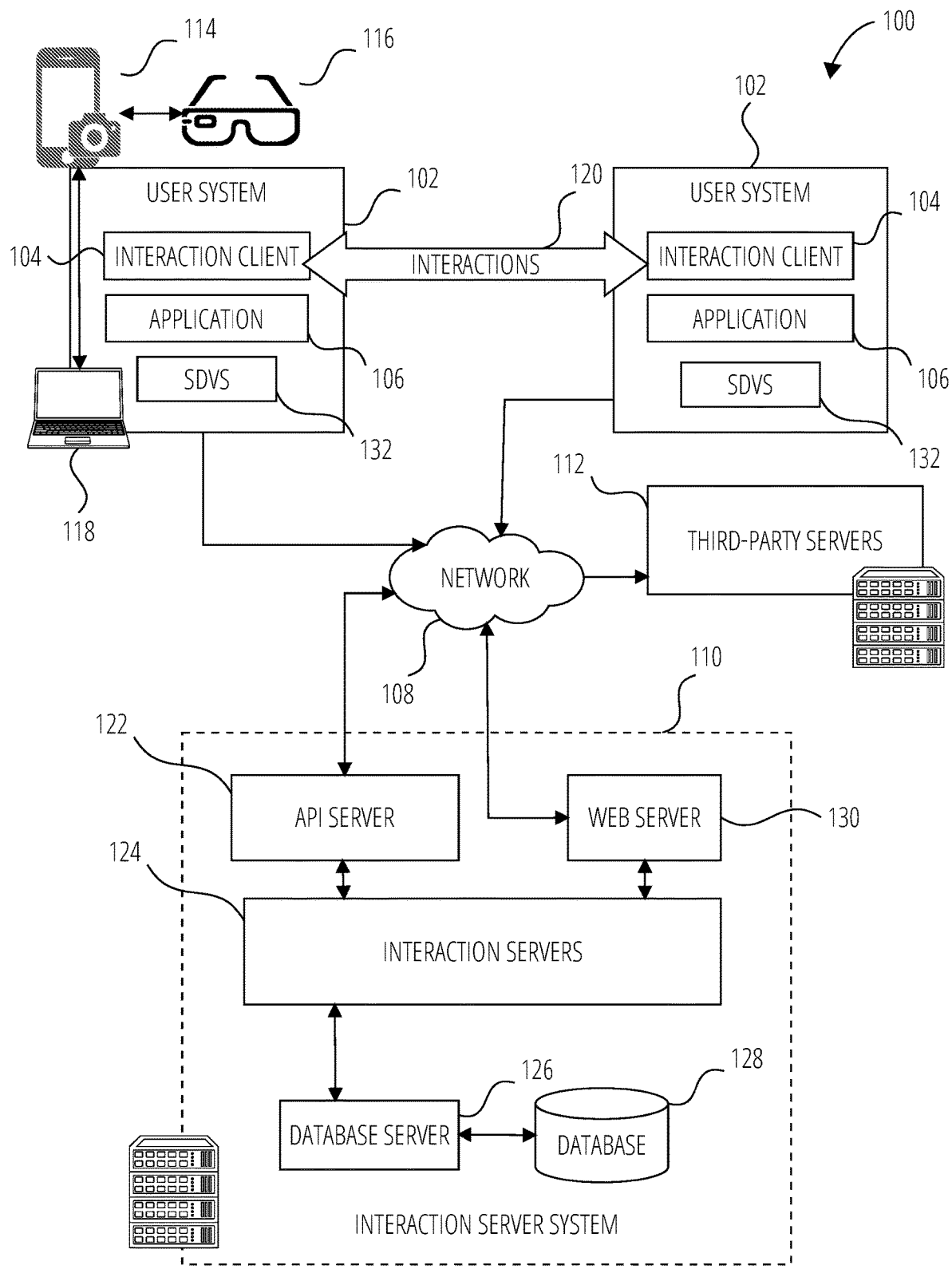
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 510); the location of friends within an entity relationship graph; and opening an application event (e.g., relating to the interaction client 104).

A secure data vault system 132 is also shown, suitable for processing of raw data for the devices 114, 116, 118. As mentioned earlier, raw data includes data produced via cameras, microphones, and/or other sensors, such as gyroscopes, navigation systems (e.g., global positioning systems, inertial navigation systems), temperature sensors, and so on, included in the devices 114, 116, 118. In some embodiments, raw data is only processed via the secure data vault system 132, thus providing data isolation and security.

Indeed, the secure data vault system is an isolated and secure environment within an operating system (OS), such as an AR OS. The secure data vault system maintains separation from application 106 while enabling users/creators to maintain control over their data. In some embodiments, the secure data vault system is part of the OS but includes hardware components for providing isolation and trust, as further described below. The secure data vault system also enables the local execution of machine learning and generative AI models that use the raw data as input. That is, certain generative AI models are trained to take the raw data as input and then output AR "tokens," such as virtual content suitable for overlaying on top of real world images. These generative AI models are only executed locally in respective device 114, 116, 118 by the secure data vault system 132 and not in an external system, such as an external server or a cloud-based system.

Figure 2:
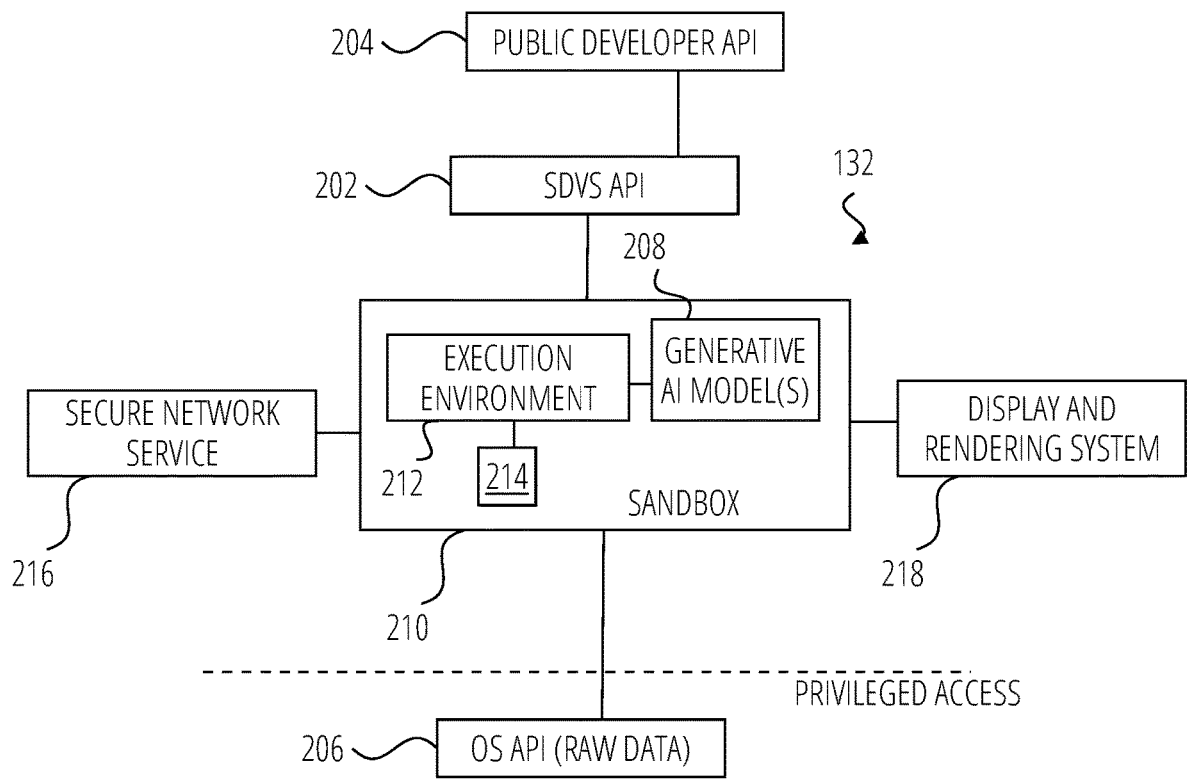
FIG. 2 is a block diagram illustrating details of an example of a secure data vault system, according to some examples.

FIG. 2 is a block diagram illustrating further details of an example of the secure data vault system 132, according to some examples. In the depicted example, the secure data vault system 132 includes an application programming interface (API) 202 that is used by developers to interface with and execute certain functionality of the secure data vault system 132. In some embodiments, a developer-provided API, such as via a depicted public developer API 204, is used to interface with the secure data vault system 132 via the API 202.

The API 202 includes functions calls, methods, object oriented classes, and so on, that can execute certain functionality provided by the secure data vault system 132. In some embodiments, the API 202 can include certain security functionality such as authenticating use of the API 202 by a developer via receipt of a security token, a login/password combination, a challenge/response authentication, a secure handshake authentication, and so on. Once a session is authenticated, the secure data vault system 132 then is able to receive raw data via a privileged access OS API 206. More specifically, the privileged access OS API 206 is only used by the secure data vault system 132, and not by any other system, to receive raw data.

As mentioned above, the raw data includes camera data, microphone data, and/or sensor data for various sensors included in a device (e.g., AR device, VR device), such as the devices 114, 116, 118. In some embodiments, the OS is also granted access to the raw data, for example, to conduct tests of the camera, microphone, and/or other sensors, to calibrate the camera, microphone, and/or other sensors, and so on. By isolating raw data to only be processed via the secure data vault system 132 when using the camera, microphone, and/or other sensors, the techniques described herein improve security and enhance privacy. For example, a user of the devices 114, 116, 118 may be enjoying an AR experience that includes new images and/or video created via generative AI models 208. The secure data vault system 132 will completely execute the generative AI models 208 in an execution environment 212 to enhance security and privacy.

That is, the execution environment 212 is fully enclosed in a sandbox environment 210. The sandbox environment enables added isolation and security. For example, the sandbox environment 210 ensures that any actions performed within it stay isolated from the rest of the system, preventing potential harm from malicious software or unintended consequences from code. In some examples, the execution environment 212 restricts execution of instructions or code to a predefined memory range (e.g., a start memory address and an end memory address). By isolating the application or code, such as the code used to execute the generative AI models 208, the sandbox environment 210 reduces the risk of security vulnerabilities, such as buffer overflows or privilege escalation, from affecting the entire system. If the one or more of the generative AI models 208 executing within the sandbox environment 210 behaves unexpectedly or becomes unresponsive, it can be terminated without affecting the rest of the system. The sandbox environment 210 can additionally use virtualization technology to create a completely separate virtual machine (VM) or container to host the isolated execution environment 212. In some embodiments, the sandbox environment 210 is a separate hardware system. For example, a field programmable gate array (FPGA), a separate microprocessor, a custom circuitry, and so on, can be provided as part of the devices 114, 116, 118, and used as the sandbox environment 210. Accordingly, attack vectors are minimized, for example, by minimizing exposing code that could be changed maliciously.

The secure data vault system 132 puts constraints on data sharing on the device and off the device (network). In some embodiments, the secure data vault system 132 can communicate with trusted feature sets only. An allow list of processes/features can be put in a secure compatibility matrix 214. For example, columns in the secure compatibility matrix 214 list various functions that the secure data vault system 132 provides, and rows of the secure compatibility matrix 214 list processes that have access to the various functions. According, a process can call the API 202 and request a certain function to be executed, including functions related to the generative AI models (e.g., providing outputs based on inputs, upgrading to a newer model version, and so on), and the secure compatibility matrix 214 can then be checked to verify that the process has permission to execute the function.

A secure network service 216 is also shown, included in the secure data vault system 132. The secure network service 216 is used to communicate with external systems for updates of the AI models 208, the execution environment 212, and/or the secure compatibility matrix 214. The secure network service 216 can use techniques such as transport layer security (TLS) in a hypertext transfer protocol secure (HTTPS) download only mode. That is, the secure network service 216 can be used, in some examples, only for downloading of information, such as newer versions of the generative AI models 208. Authentication for the downloads via the secure network service 216 can be provided via challenge/response hardware techniques (e.g., via a hardware security token device that provides for multi-factor authentication), the use of secret keys, timeslot downloads (e.g., where a download only occurs at given times of a day), and so on.

A display and rendering system 218 is also included in the secure data vault system 132, suitable for dynamically creating three-dimensional (3D) representations and for displaying the 3D representations, for example, as overlays over a real-time view of the surrounds as provided by the camera. Sound can also be provided via the display and rendering system 218.

The display and rendering system 218 additionally includes using outputs from the generative AI models 208 to render certain virtual content. For example, the generative AI models may be used for gaming, to create filters, stickers, animations, and so on, based on the input data. For example, the camera data may include real-time pictures of people in a room, and the generative AI models 208 can then create virtual animations of the people. Likewise, gameplay may be generated on the fly via the generative AI models 208.

The display and rendering system 218 additionally includes security features such as using the generative AI models 208 to detect and obfuscate images and/or sound that may have been found private. As mentioned earlier, certain documents (e.g., driver's license, credit card, social security card, passport) may have been viewed during an AR session. The generative AI models 208 can detect the presence of private information, and collaborate with the display and rendering system 218 to blur images and/or mute sounds, thus preserving privacy. In some embodiments, the display and rendering system 218 can also provide notifications to the user of the presence of private information. By providing for an isolated, secure, and local execution via the sandbox environment 210, the secure data vault systems 132 improves on privacy and user security in a variety of AR systems.

Figure 3:
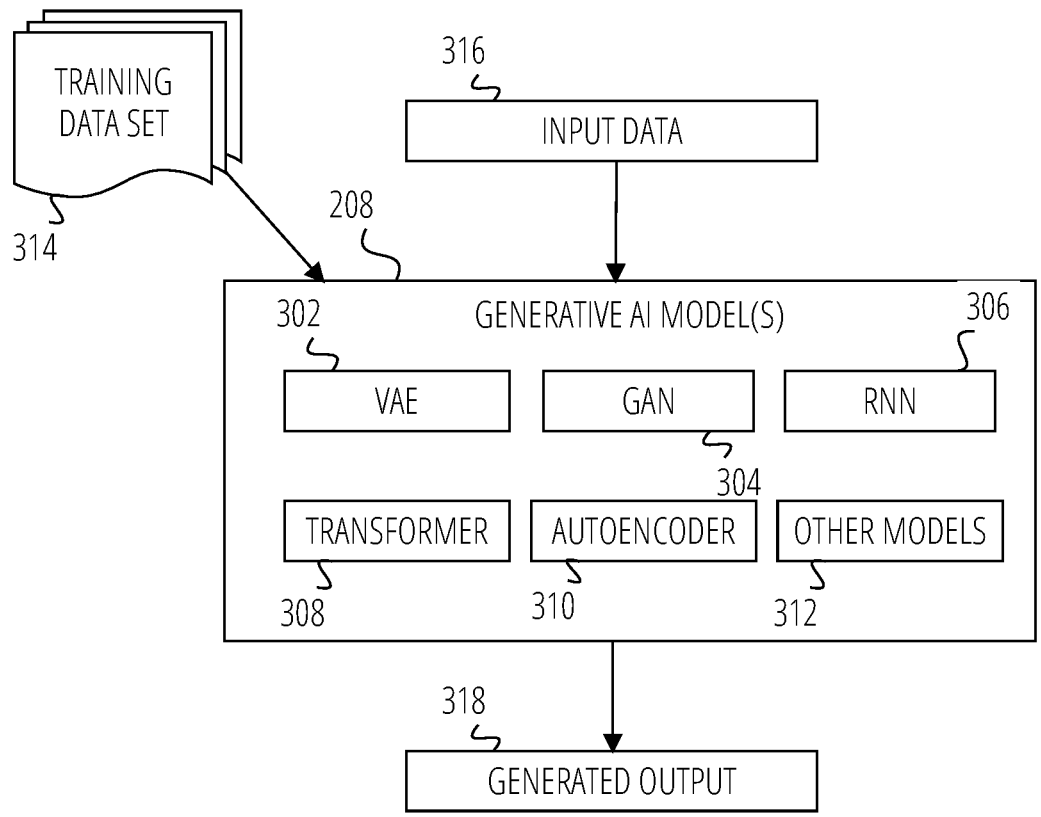
FIG. 3 is a block diagram of various generative AI models that are store in the secure data vault of FIG. 2, according to some examples.

FIG. 3 is a block diagram showing further details of the generative AI models 208, according to some examples. In the depicted example, the generative AI models 208 include various model types, such as a Variational Autoencoder (VAE) model 302, a Generative Adversarial Network (GAN) model 304, a Recurrent Neural Network (RNN) model 306, a Transformer model 308, an Autoencoder model 310, and other models 312. The VAE model 302 learn a probabilistic mapping between data and a latent space and can be used for tasks like image generation and data compression. The GAN model 304 consist of a generator and a discriminator, trained in a competitive manner.

The RNN model 306 computes a time step that depends on a previous time step. The RNN model 306 has connections that loop back on themselves, allowing them to maintain a hidden state representing information about the previous elements in the sequence they've processed. This hidden state allows the RNN model 306 to exhibit dynamic temporal behavior, making them well-suited for tasks involving sequences. The Transformer model 308 is based on a neural network architecture designed for processing sequential data, with a primary focus on natural language processing tasks like machine translation and text generation. The Transformer model 308 was introduced in the paper "Attention is All You Need" by Vaswani et al. in 2017. The Autoencoder model 310 is a type of model that learns to reconstruct input data from a lower-dimensional representation. Other models 312 are also used, such as variants of Large Language Models (LLMs).

In the depicted embodiment, the various generative AI models 208 are trained using training data sets 314. The training data set 314, in some examples, is not part of the secure data vault system 132 but only the trained generative AI models 208 are used inside of the secure data vault system 132. The training data sets 314 include AR and VR data, such as images, videos, audio, text, stickers, animations, filters, and so on, for example, created during use of AR and VR devices. Other data, such as a "recording" of the AR and VR experience when using the AR and VR devices is also part of the training data sets 314. To train the generative AI models 208, a training overview is as follows:
Data Collection and Preprocessing:
  Gather a diverse and extensive dataset containing data from the domain of interest. This dataset can include VR/AR recordings, audio, images, video, books, articles, websites, and other textual sources.

Preprocess the data by tokenizing the text into smaller
    units, such as words or subword pieces, image pieces,
    video pieces, and so on, and perform any necessary
    cleaning and formatting.
Tokenization and Vocabulary Creation:
    Tokenize the data (e.g., text (into units that the model can
        process, such as subwords or words. Tokenization is
        used for creating a vocabulary that the model uses
        during training.
    Build a vocabulary from the tokens in the training data.
        This vocabulary defines the set of tokens that the model
        can recognize and generate.
Model Initialization:
    Initialize the generative AI models 208 with random
        weights or pretrained weights if fine-tuning an existing
        model.
Pretraining:
    Pretrain the model on a large amounts of data in an
        unsupervised manner. During pretraining, the model
        learns to predict the next token in a sequence (e.g.,
        autoregressive language modeling) or perform other
        unsupervised tasks like masked language modeling.
    Techniques such as batch processing, distributed computing, and parallelism to handle the large amount of data
        efficiently.
Loss Function:
    Define a suitable loss function for the pretraining task,
        such as cross-entropy loss.
Optimization:
    Choose an optimization algorithm (e.g., Adam, SGD) and
        tune hyperparameters like learning rate, batch size, and
        weight decay.
    Apply gradient clipping to prevent exploding gradients.
Training:
    Train the model on the pretraining task for a large number
        of iterations or epochs. This step can take some time.
    Monitor training progress, track loss values, and use
        evaluation metrics to assess model performance.
Fine-Tuning:
    After pretraining, you can fine-tune the model on domain-specific tasks or downstream tasks by adding task-specific layers and training the model on labeled data.
    Fine-tuning adapts the pretrained generative AI models
        208 to specific applications like text classification,
        language translation, or question answering.
Regularization:
    Apply regularization techniques such as dropout or
        weight decay to prevent overfitting.
Validation and Evaluation:
    Use validation datasets to select the best model checkpoint based on performance metrics relevant to task
        such as displaying AR/VR content.
    Evaluate the model on a separate test dataset to assess its
        generalization performance.

The trained generative AI models 208 are then deployed as part of the secure data vault system 132. In operations, the secure data vault system 132 provides for various inputs into the generative AI models 208. For example, during AR/VR activities, camera data, audio, positional information (e.g., gyroscopic information, geolocation information), and so on, can be provided to the generative AI models 208 as input 316. The generative AI models 208 will then produce outputs 318, such as images, videos, text, audio, animations, stickers, filters, and so on. The outputs 318 are then provided via a display, including AR/VR displays.

System Architecture

Figure 4:
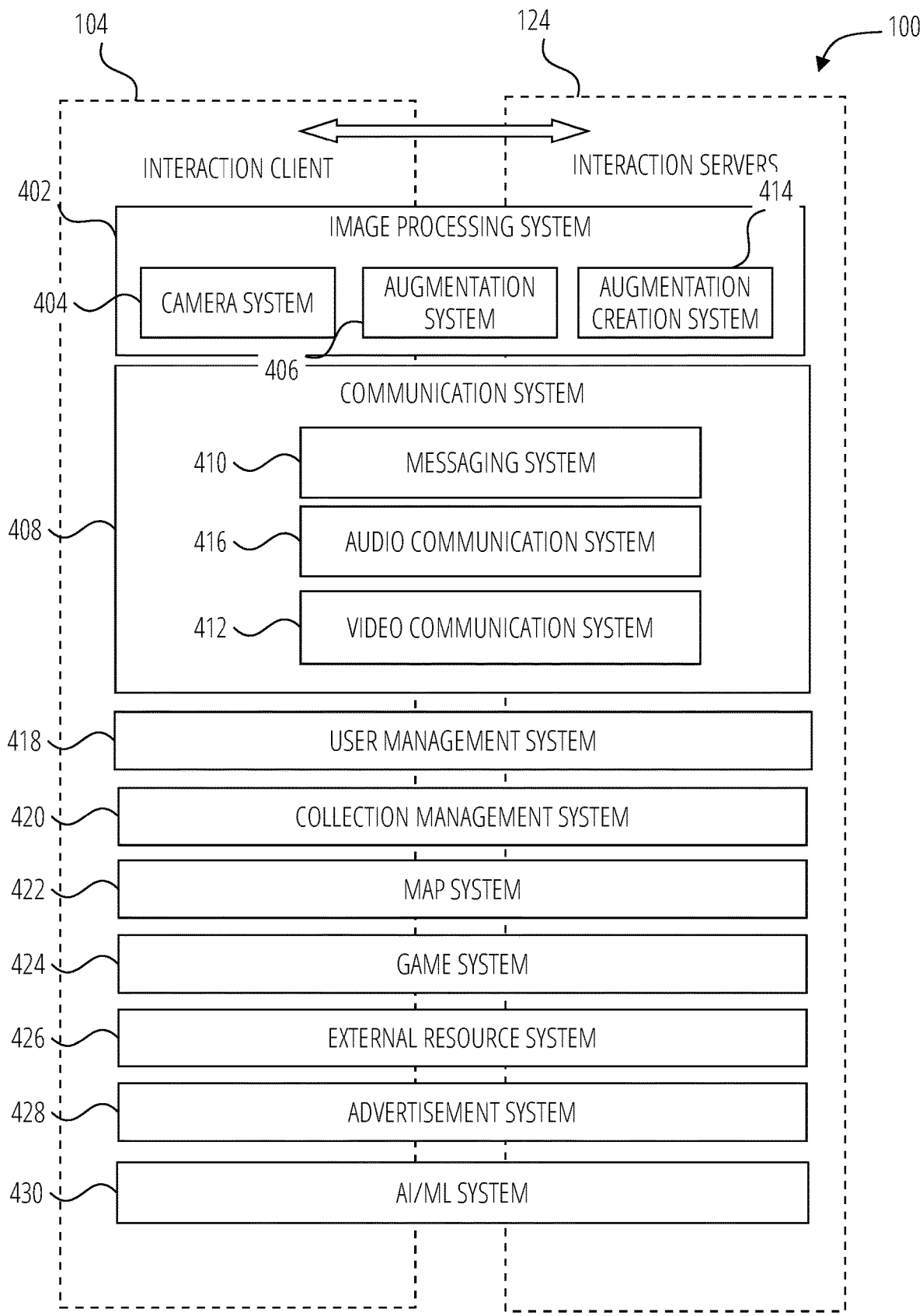
FIG. 4 is a diagrammatic representation of a messaging system that has both client-side and server-side functionality, according to some examples.

FIG. 4 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 402 provides various functions that enable a user to capture and augment (e.g., annotate or otherwise modify or edit) media content associated with a message.

A camera system 404 includes control software (e.g., in a camera application) that interacts with and controls hardware camera hardware (e.g., directly or via operating system controls) of the user system 102 to modify and augment real-time images captured and displayed via the interaction client 104.

The augmentation system 406 provides functions related to the generation and publishing of augmentations (e.g., media overlays) for images captured in real-time by cameras of the user system 102 or retrieved from memory of the user system 102. For example, the augmentation system 406 operatively selects, presents, and displays media overlays (e.g., an image filter or an image lens) to the interaction client 104 for the augmentation of real-time images received via the camera system 404 or stored images retrieved from memory 702 of a user system 102. These augmentations are selected by the augmentation system 406 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 402 may interact with, and support, the various subsystems of the communication system 408, such as the messaging system 410 and the video communication system 412.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 402 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 402 provides a user-based publication platform that enables users to select a geolocation on a map and upload content associated with the selected geolocation. The user may also specify circumstances under which a particular media overlay should be offered to other users. The image processing system 402 generates a media overlay that includes the uploaded content and associates the uploaded content with the selected geolocation.

The augmentation creation system 414 supports augmented reality developer platforms and includes an application for content creators (e.g., artists and developers) to create and publish augmentations (e.g., augmented reality experiences) of the interaction client 104. The augmentation creation system 414 provides a library of built-in features and tools to content creators including, for example custom shaders, tracking technology, and templates.

In some examples, the augmentation creation system 414 provides a merchant-based publication platform that enables merchants to select a particular augmentation associated with a geolocation via a bidding process. For example, the augmentation creation system 414 associates a media overlay of the highest bidding merchant with a corresponding geolocation for a predefined amount of time.

A communication system 408 is responsible for enabling and processing multiple forms of communication and interaction within the interaction system 100 and includes a messaging system 410, an audio communication system 416, and a video communication system 412. The messaging system 410 is responsible for enforcing the temporary or time-limited access to content by the interaction clients 104. The messaging system 410 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 416 enables and supports audio communications (e.g., real-time audio chat) between multiple interaction clients 104. Similarly, the video communication system 412 enables and supports video communications (e.g., real-time video chat) between multiple interaction clients 104.

A user management system 418 is operationally responsible for the management of user data and profiles, and maintains entity information (e.g., stored in entity tables 508, entity graphs 510 and profile data 502) regarding users and relationships between users of the interaction system 100.

A collection management system 420 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 420 may also be responsible for publishing an icon that provides notification of a particular collection to the user interface of the interaction client 104. The collection management system 420 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 420 employs machine vision (or image recognition technology) and content rules to curate a content collection automatically. In certain examples, compensation may be paid to a user to include user-generated content into a collection. In such cases, the collection management system 420 operates to automatically make payments to such users to use their content.

A map system 422 provides various geographic location (e.g., geolocation) functions and supports the presentation of map-based media content and messages by the interaction client 104. For example, the map system 422 enables the display of user icons or avatars (e.g., stored in profile data 502) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 424 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 426 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 428 operationally enables the purchasing of advertisements by third parties for presentation to end-users via the interaction clients 104 and also handles the delivery and presentation of these advertisements.

An artificial intelligence and machine learning system 430 provides a variety of services to different subsystems within the interaction system 100. For example, the artificial intelligence and machine learning system 430 operates with the image processing system 402 and the camera system 404 to analyze images and extract information such as objects, text, or faces. This information can then be used by the image processing system 402 to enhance, filter, or manipulate images. The information can also be used to train the generative AI models 208 as well as provide inputs to the generative AI models 208. The artificial intelligence and machine learning system 430 may be used by the augmentation system 406 to generate augmented content and augmented reality experiences, such as adding virtual objects or animations to real-world images. The communication system 408 and messaging system 410 may use the artificial intelligence and machine learning system 430 to analyze communication patterns and provide insights into how users interact with each other and provide intelligent message classification and tagging, such as categorizing messages based on sentiment or topic. The artificial intelligence and machine learning system 430 may also provide chatbot functionality to message interactions 120 between user systems 102 and between a user system 102 and the interaction server system 110. The artificial intelligence and machine learning system 430 may also work with the audio communication system 416 to provide speech recognition and natural language processing capabilities, allowing users to interact with the interaction system 100 using voice commands.

Data Architecture

Figure 5:
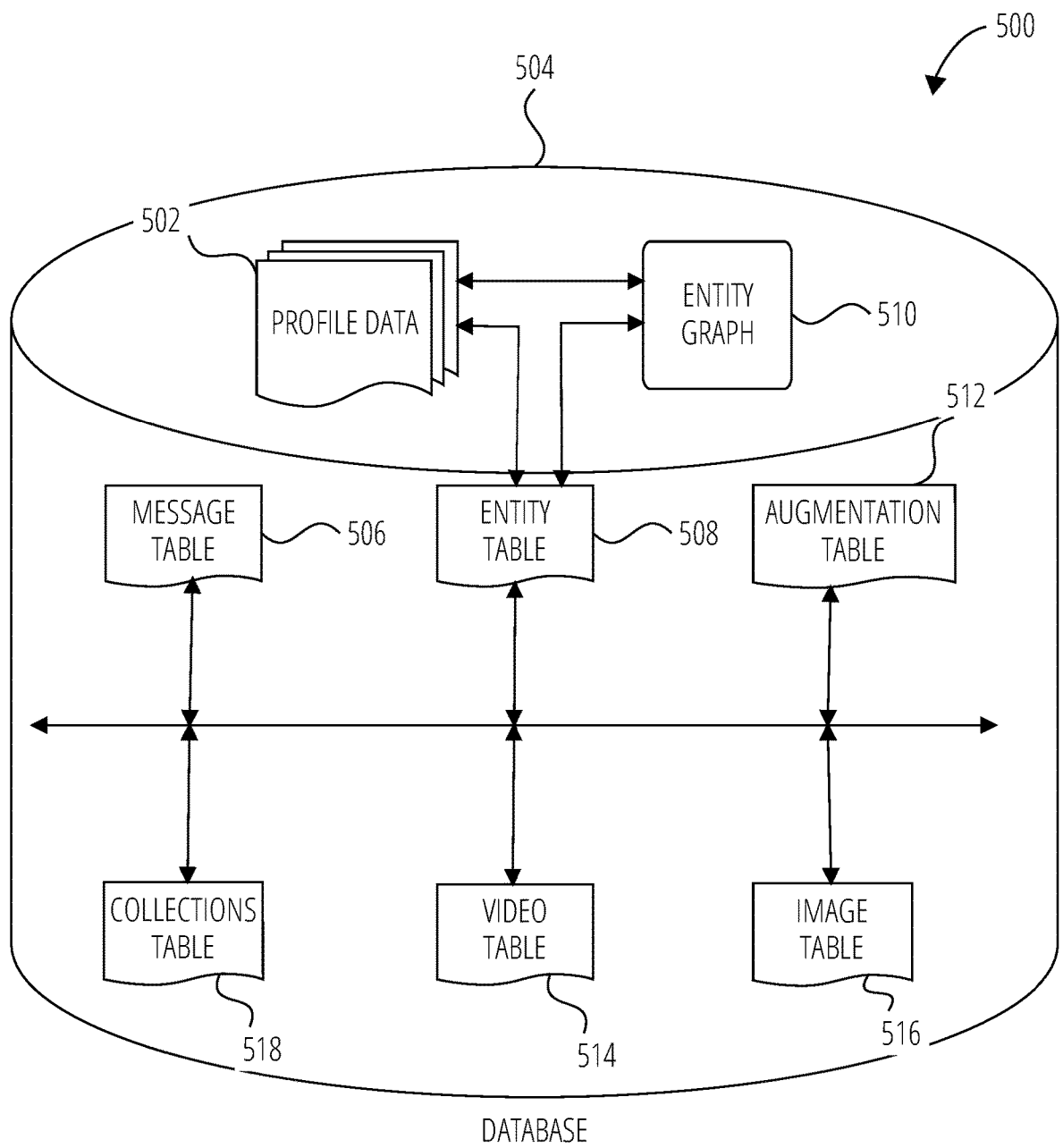
FIG. 5 is a diagrammatic representation of a data structure as maintained in a database, according to some examples.

FIG. 5 is a schematic diagram illustrating data structures 500, which may be stored in the database 504 of the interaction server system 110, according to certain examples. While the content of the database 504 is shown to comprise multiple tables, it will be appreciated that the data could be stored in other types of data structures (e.g., as an object-oriented database).

The database 504 includes message data stored within a message table 506. This message data includes, for any particular message, at least message sender data, message recipient (or receiver) data, and a payload. Further details regarding information that may be included in a message, and included within the message data stored in the message table 506, are described below with reference to FIG. 5.

An entity table 508 stores entity data, and is linked (e.g., referentially) to an entity graph 510 and profile data 502. Entities for which records are maintained within the entity table 508 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 510 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 508. Such privacy settings may be applied to all types of relationships within the context of the interaction system 100, or may selectively be applied to certain types of relationships.

The profile data 502 stores multiple types of profile data about a particular entity. The profile data 502 may be selectively used and presented to other users of the interaction system 100 based on privacy settings specified by a particular entity. Where the entity is an individual, the profile data 502 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 502 for the group may similarly include one or more avatar representations associated with the group, in addition to the group name, members, and various settings (e.g., notifications) for the relevant group.

The database 504 also stores augmentation data, such as overlays or filters, in an augmentation table 512. The augmentation data is associated with and applied to videos (for which data is stored in a video table 514) and images (for which data is stored in an image table 516).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 516 includes augmented reality content items (e.g., corresponding to applying "lenses" or augmented reality experiences). An augmented reality content item may be a real-time special effect and sound that may be added to an image or a video.

A collections table 518 stores data regarding collections of messages and associated image, video, or audio data, which are compiled into a collection (e.g., a story or a gallery). The creation of a particular collection may be initiated by a particular user (e.g., each user for which a record is maintained in the entity table 508). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 514 stores video data that, in some examples, is associated with messages for which records are maintained within the message table 506. Similarly, the image table 516 stores image data associated with messages for which message data is stored in the entity table 508. The entity table 508 may associate various augmentations from the augmentation table 512 with various images and videos stored in the image table 516 and the video table 514.

Data Communications Architecture

Figure 6:
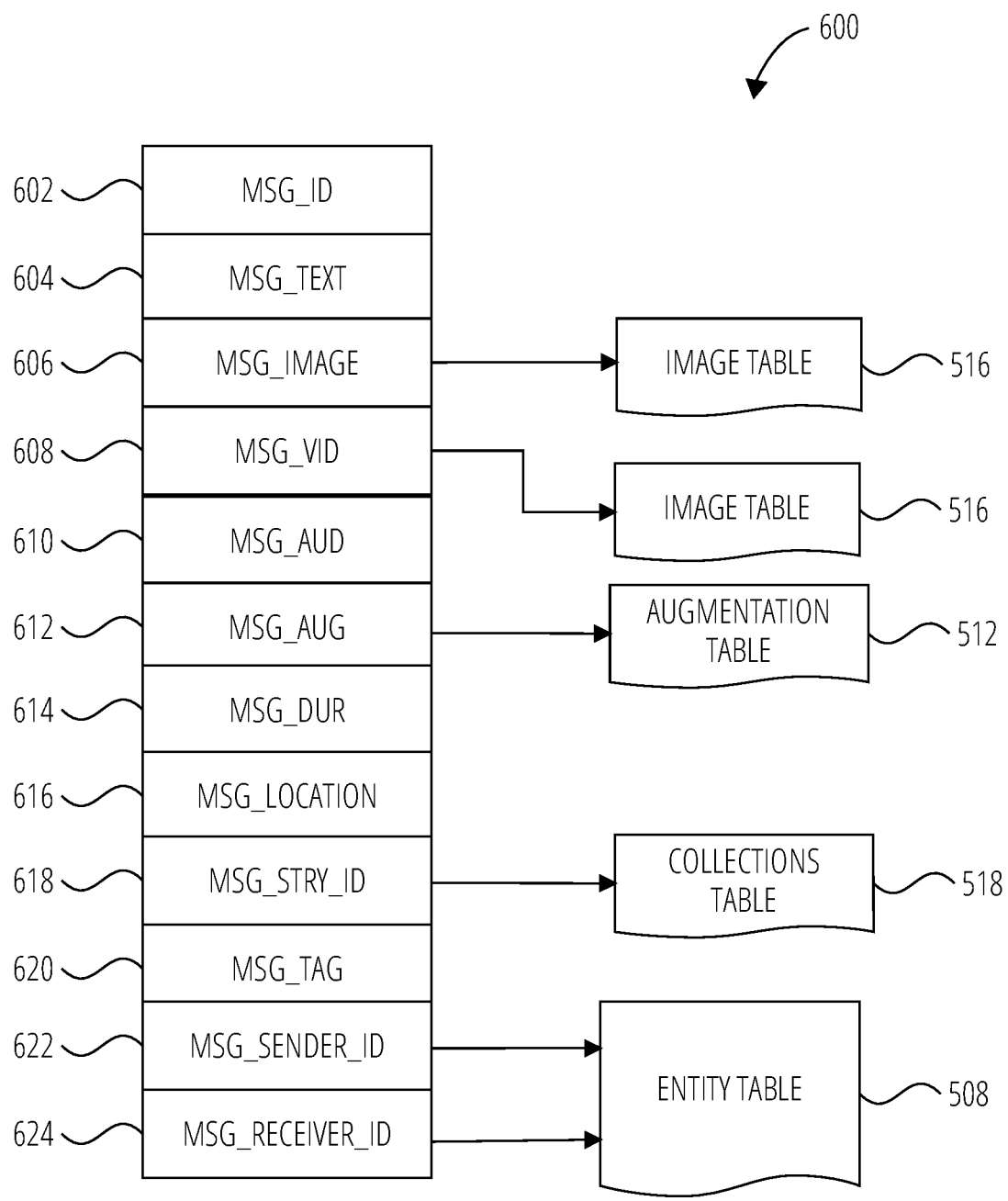
FIG. 6 is a diagrammatic representation of a message, according to some examples.

FIG. 6 is a schematic diagram illustrating a structure of a message 600, according to some examples, generated by an interaction client 104 for communication to a further interaction client 104 via the interaction servers 124. The content of a particular message 600 is used to populate the message table 506 stored within the database 504, accessible by the interaction servers 124. Similarly, the content of a message 600 is stored in memory as "in-transit" or "in-flight" data of the user system 102 or the interaction servers 124. A message 600 is shown to include the following example components:

Message identifier 602: a unique identifier that identifies the message 600.

Message text payload 604: text, to be generated by a user via a user interface of the user system 102, and that is included in the message 600.

Message image payload 606: image data, captured by a camera component of a user system 102 or retrieved from a memory component of a user system 102, and that is included in the message 600. Image data for a sent or received message 600 may be stored in the image table 516.

Message video payload 608: video data, captured by a camera component or retrieved from a memory component of the user system 102, and that is included in the message 600. Video data for a sent or received message 600 may be stored in the image table 516.

Message audio payload 610: audio data, captured by a microphone or retrieved from a memory component of the user system 102, and that is included in the message 600.

Message augmentation data 612: augmentation data (e.g., filters, stickers, or other annotations or enhancements) that represents augmentations to be applied to message image payload 606, message video payload 608, or message audio payload 610 of the message 600. Augmentation data for a sent or received message 600 may be stored in the augmentation table 512.

Message duration parameter 614: parameter value indicating, in seconds, the amount of time for which content of the message (e.g., the message image payload 606, message video payload 608, message audio payload 610) is to be presented or made accessible to a user via the interaction client 104.

Message geolocation parameter 616: geolocation data (e.g., latitudinal and longitudinal coordinates) associated with the content payload of the message. Multiple message geolocation parameter 616 values may be included in the payload, each of these parameter values being associated with respect to content items included in the content (e.g., a specific image within the message image payload 606, or a specific video in the message video payload 608).

Message story identifier 618: identifier values identifying one or more content collections (e.g., "stories" identified in the collections table 518) with which a particular content item in the message image payload 606 of the message 600 is associated. For example, multiple images within the message image payload 606 may each be associated with multiple content collections using identifier values.

Message tag 620: each message 600 may be tagged with multiple tags, each of which is indicative of the subject matter of content included in the message payload. For example, where a particular image included in the message image payload 606 depicts an animal (e.g., a lion), a tag value may be included within the message tag 620 that is indicative of the relevant animal. Tag values may be generated manually, based on user input, or may be automatically generated using, for example, image recognition.

Message sender identifier 622: an identifier (e.g., a messaging system identifier, email address, or device identifier) indicative of a user of the user system 102 on which the message 600 was generated and from which the message 600 was sent.

Message receiver identifier 624: an identifier (e.g., a messaging system identifier, email address, or device identifier) indicative of a user of the user system 102 to which the message 600 is addressed.

The contents (e.g., values) of the various components of message 600 may be pointers to locations in tables within which content data values are stored. For example, an image value in the message image payload 606 may be a pointer to (or address of) a location within an image table 516. Similarly, values within the message video payload 608 may point to data stored within an image table 516, values stored within the message augmentation data 612 may point to data stored in an augmentation table 512, values stored within the message story identifier 618 may point to data stored in a collections table 518, and values stored within the message sender identifier 622 and the message receiver identifier 624 may point to user records stored within an entity table 508.

System with Head-Wearable Apparatus

Figure 7:
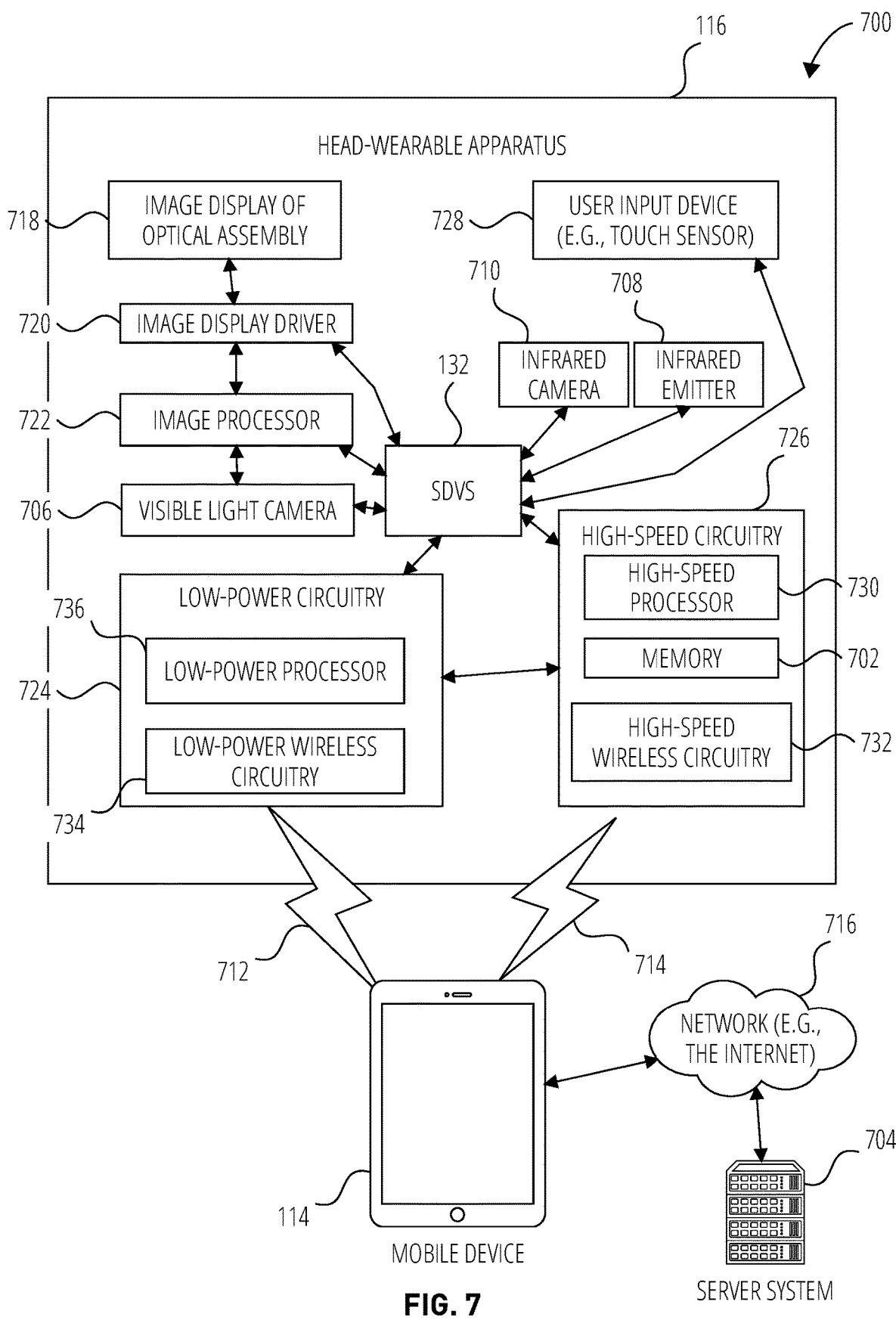
FIG. 7 illustrates a system in which the head-wearable apparatus, according to some examples.

FIG. 7 illustrates a system 700 including a head-wearable apparatus 116 with a selector input device, according to some examples. FIG. 7 is a high-level functional block diagram of an example head-wearable apparatus 116 communicatively coupled to a mobile device 114 and various server systems 704 (e.g., the interaction server system 110) via various networks 108.

The head-wearable apparatus 116 includes one or more cameras, each of which may be, for example, a visible light camera 706, an infrared emitter 708, and an infrared camera 710 communicatively and/or operatively coupled to the secure data vault system 132.

The mobile device 114 connects with head-wearable apparatus 116 using both a low-power wireless connection 712 and a high-speed wireless connection 714. The mobile device 114 is also connected to the server system 704 and the network 716.

The head-wearable apparatus 116 further includes two image displays of the image display of optical assembly 718. The two image displays of optical assembly 718 include one associated with the left lateral side and one associated with the right lateral side of the head-wearable apparatus 116. The head-wearable apparatus 116 also includes an image display driver 720, an image processor 722, low-power circuitry 724, and high-speed circuitry 726. The image display of optical assembly 718 is for presenting images and videos, including an image that can include a graphical user interface to a user of the head-wearable apparatus 116.

The image display driver 720 commands and controls the image display of optical assembly 718. The image display driver 720 may deliver image data directly to the image display of optical assembly 718 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 728 (e.g., touch sensor or push button), including an input surface on the head-wearable apparatus 116. The user input device 728 (e.g., touch sensor or push button) is to receive from the user an input selection to manipulate the graphical user interface of the presented image.

The components shown in FIG. 7 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 706 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 702, which stores instructions to perform a subset or all of the functions described herein. The memory 702 can also include storage device.

As shown in FIG. 7, the high-speed circuitry 726 includes a high-speed processor 730, a memory 702, and high-speed wireless circuitry 732. In some examples, the image display driver 720 is coupled to the high-speed circuitry 726 via the secure data vault system 132 and operated by the display and rendering system 218 in order to drive the left and right image displays of the image display of optical assembly 718. The high-speed processor 730 may be any processor capable of managing high-speed communications and operation of any general computing system needed for the head-wearable apparatus 116 and is included in the display and rendering system 218. The high-speed processor 730 includes processing resources needed for managing high-speed data transfers on a high-speed wireless connection 714 to a wireless local area network (WLAN) using the high-speed wireless circuitry 732. In certain examples, the high-speed processor 730 executes an operating system such as a LINUX operating system or other such operating system of the head-wearable apparatus 116, and the operating system is stored in the memory 702 for execution. In addition to any other responsibilities, the high-speed processor 730 executing a software architecture for the head-wearable apparatus 116 is used to manage data transfers with high-speed wireless circuitry 732. In certain examples, the high-speed wireless circuitry 732 is configured to implement Institute of Electrical and Electronic Engineers (IEEE) 802.11 communication standards, also referred to herein as WI-FI®. In some examples, other high-speed communications standards may be implemented by the high-speed wireless circuitry 732.

The low-power wireless circuitry 734 and the high-speed wireless circuitry 732 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 712 and the high-speed wireless connection 714, may be implemented using details of the architecture of the head-wearable apparatus 116, as can other elements of the network 716.

The memory 702 includes any storage device capable of storing various data and applications, including, among other things, camera data generated by the left and right visible light cameras 706, the infrared camera 710, and the image processor 722, as well as images generated for display by the image display driver 720 on the image displays of the image display of optical assembly 718. While the memory 702 is shown as integrated with high-speed circuitry 726, in some examples, the memory 702 may be an independent standalone element of the head-wearable apparatus 116. In certain such examples, electrical routing lines may provide a connection through a chip that includes the high-speed processor 730 from the image processor 722 or the low-power processor 736 to the memory 702. In some examples, the high-speed processor 730 may manage addressing of the memory 702 such that the low-power processor 736 will boot the high-speed processor 730 any time that a read or write operation involving memory 702 is needed.

As shown in FIG. 7, the low-power processor 736 or high-speed processor 730 of the head-wearable apparatus 116 can be coupled to the camera (visible light camera 706, infrared emitter 708, or infrared camera 710), the image display driver 720, the user input device 728 (e.g., touch sensor or push button), and the memory 702. In some embodiments, the low-power circuitry 724 and the high-speed circuitry 726 are both included in the secure data vault system 132.

The head-wearable apparatus 116 is connected to a host computer. For example, the head-wearable apparatus 116 is paired with the mobile device 114 via the high-speed wireless connection 714 or connected to the server system 704 via the network 716. The server system 704 may be one or more computing devices as part of a service or network computing system, for example, that includes a processor, a memory, and network communication interface to communicate over the network 716 with the mobile device 114 and the head-wearable apparatus 116.

The mobile device 114 includes a processor and a network communication interface coupled to the processor. The network communication interface allows for communication over the network 716, low-power wireless connection 712, or high-speed wireless connection 714. Mobile device 114 can further store at least portions of the instructions in the memory of the mobile device 114 memory to implement the functionality described herein. In some embodiments, the low-power circuitry 724 and the high-speed wireless circuitry 732 are included in the secure network service 216 and only used to download data, such as update packages, into the secure data vault system 132. For example, the update packages can include computer instructions configured to update the sandbox system, the secure network service 216, and/or the display and rendering system 218 to newer versions. The update package is encrypted and a secret key stored in the sandbox system 210 is then used to decrypt and verify the validity of the update package. In some examples, the secret key used to decrypt the update package is a pretty good privacy (PGP) private key. Accordingly, a PGP public key shared by the sandbox system 210 is used to encrypt the update package. Verification can then be done by reading a header of the update package after decryption. The header can contain, for example, a cyclic redundancy check (CRC) code to verify the integrity of the instructions included in the update package.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 720. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 704, such as the user input device 728, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 712 and high-speed wireless connection 714 from the mobile device 114 via the low-power wireless circuitry 734 or high-speed wireless circuitry 732.

Figure 8:
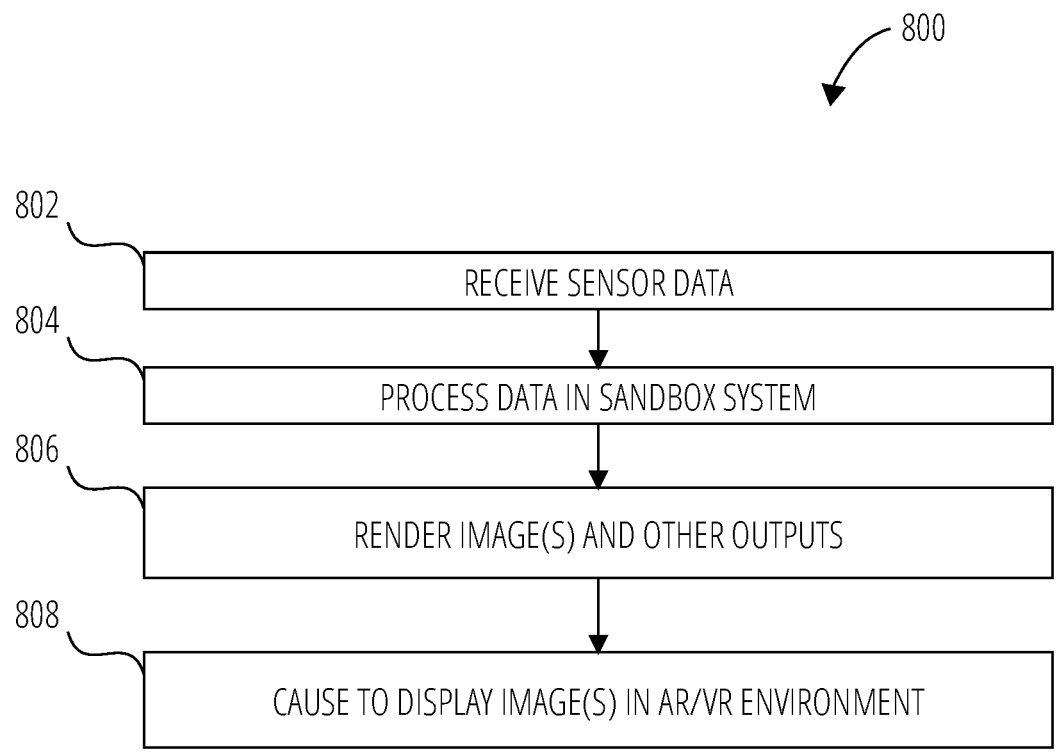
FIG. 8 illustrates a process suitable for retrieving and displaying certain group communication items, including media montages, according to some examples.

FIG. 8 is an example process 800 suitable for using the secure data vault system 132, according to some embodiments. In the depicted embodiment, the process 800 receives, at block 802, sensor data from various sensors of an AR and/or VR system (e.g., the user system 102), such as sensors communicatively coupled to the user system 102 (e.g., camera, microphone, gyroscopes, navigation system sensors, biometric sensors, and so on). In some embodiments, the sensors are coupled to the secure data vault system 132 only and thus send sensor signals only to the secure data vault system 132.

The process 800, at block 804, processes the sensor data in the sandbox system 210. As mentioned earlier, the sandbox system 210 can be a hardware-bases system such as an FPGA, one or more processors, and/or one or more custom chips. In operations, programs (e.g, computer instructions) executable via the sandbox system 210 are isolated so that the programs can crash without affecting non-sandboxed systems of the AR system. For example, the sandbox system 210, via the execution environment 212, disallows the execution of computer instructions outside of a designated memory address ranges (e.g., memories outside of the sandbox system 210) and the computer instructions are executed by the sandbox system 210 only.

Additionally, the secure compatibility matrix is used to restrict program execution in the sandbox system 210. For example, the secure compatibility matrix includes rows that store unique process (e.g., computer program) identification data and columns that store instructions executable by respective processes identified by the process identification data. That is, the columns include functions, methods, classes, and/or object oriented objects executable by each of the processes listed in the rows. In some examples, AI model(s) used to detect private information. For example, images, sound, and/or geolocation information can be detected via the AI models that are deemed private. The processing of sensor data at block 804 can then blur images, mute and/or add noise to sounds, remove geolocation information, and so on, to preserve user privacy. The processing of sensor data at block 804 can also notify the user, via text, images, and/or voice, that private data is being detected and obfuscated.

The process 800 then renders the processed data at block 806. For example, images can be rendered via the display and rendering system 218 that have private data obfuscated via the generative AI models 208. Likewise, sound can be rendered to have noise injected or to be muted, to preserve privacy. Outputs for AR/VR experiences are also generated, e.g., via the generative AI models 208. The rendered images and/or sound are then displayed, at block 808, alongside the surrounding real-world environment. For example, a driver's license viewing viewed may now be displayed as blurred, while the surrounding real-world environment, such as a table that the driver's license is laying on, is displayed unblurred. The images also include rendered 3D images of virtual objects, avatars, and so on, that can be superimposed over the surrounding real-world environment. By applying the secure data vault system 132, the techniques described herein improve security and privacy.

Machine Architecture

Figure 9:
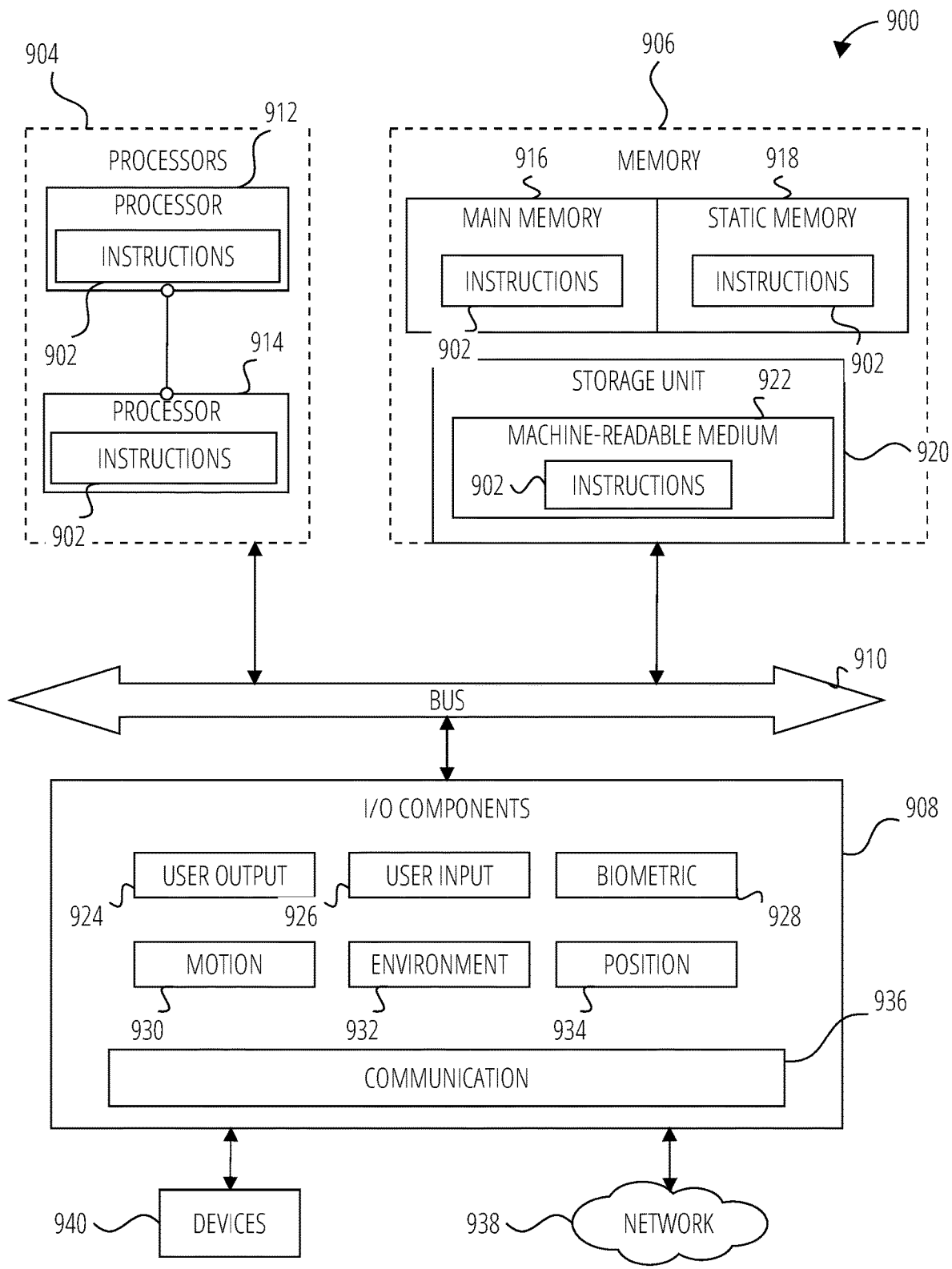
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described.

The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the interaction server system 110. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Software Architecture

Figure 10:
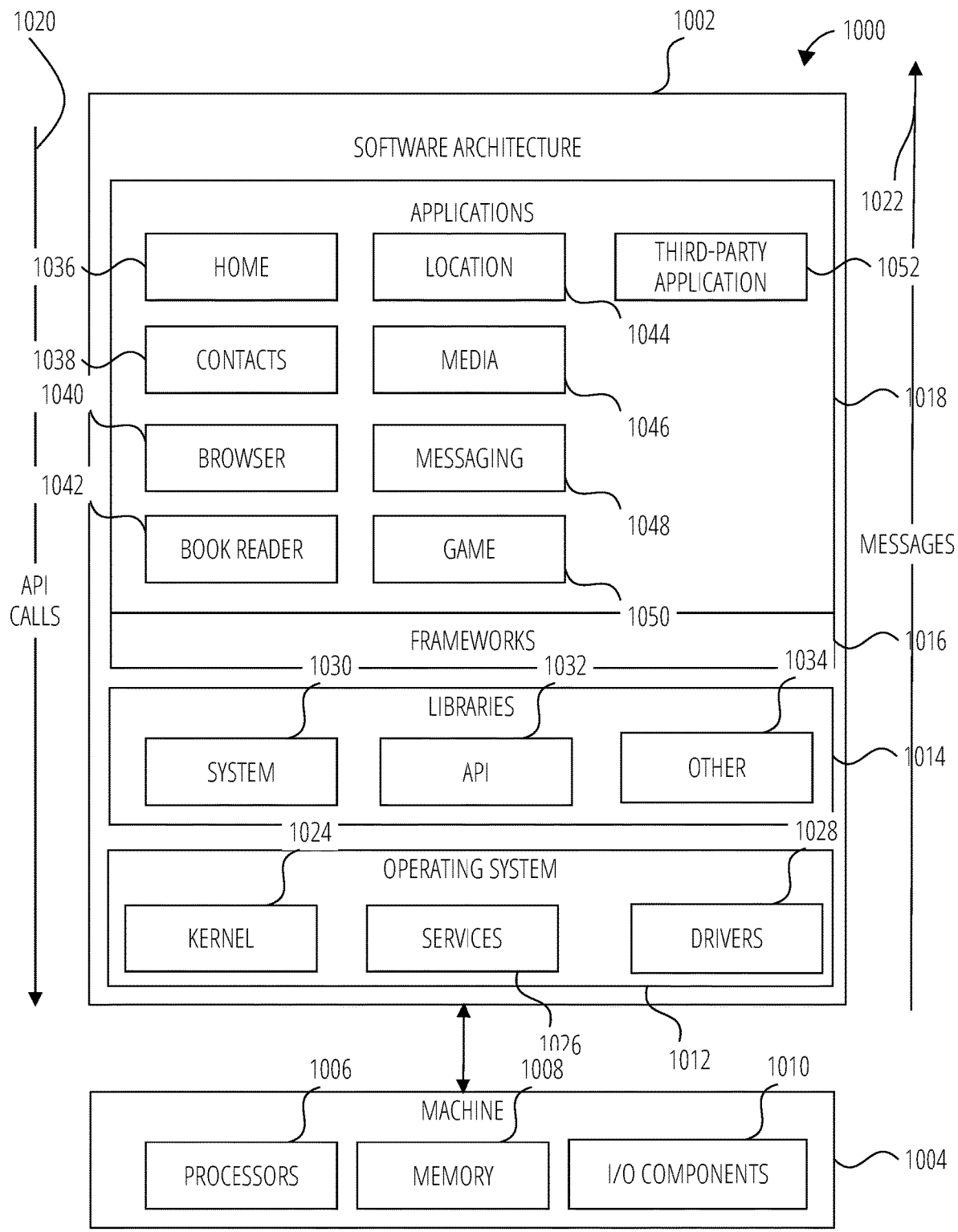
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A generative artificial intelligence (AI) system, comprising:
    a generative AI model configured to generate outputs based on a training data set;
    an augmented reality (AR) system comprising a display and a camera; and
    a secure data vault system, comprising:
        a sandbox system storing the generative AI model and operatively coupled to the camera and configured to receive camera data from the camera that is processed by the generative AI model to generate output to display superimposed on real-world environment images, wherein the generative AI model is configured to modify sections containing private information, wherein in operation of the AR system, the camera only sends camera data to the sandbox system, and wherein the sandbox system comprises an execution environment configured to restrict execution of the generative AI model to a predefined memory address range, wherein the execution environment verifies processes attempting to execute instructions based on process identification and a data store;
        a secure network service communicatively coupled to the sandbox system and configured to authenticate a connection to an external system and to download from the external system an update package for the generative AI model when the connection is authenticated; and
        an interface configured to authenticate access to the sandbox system and facilitate execution of instructions via the sandbox system.

2. The system of claim 1, wherein the output generated by the generative AI model comprises new images, text, or a combination thereof that are superimposed on real-world environment images provided by the AR system.

3. The system of claim 1, comprising a hardware-based system configured to execute the sandbox system inside of a virtual machine.

4. The system of claim 1, wherein the generative AI model comprises a variational autoencoder (VAE) models configured to learns a probabilistic mapping between data and a latent space via the training data set, a Generative Adversarial Network (GAN) model comprising a generator and a discriminator, the generator and the discriminator trained in a competitive manner, a Recurrent Neural Network (RNN) model that computes a time step that depends on a previous time step, a Transformer model used for sequential data generation, an Autoencoder model used for data compression and generation by learning to reconstruct input data from a lower-dimensional representation via the training data set, or a combination thereof.

5. The system of claim 1, wherein sections containing private information are modified by blurring sections of a real-world environment based on private information.

6. The system of claim 1, wherein the data store comprises a secure compatibility matrix comprising a plurality of rows and a plurality of columns.

7. The system of claim 6, wherein the plurality of rows comprise a plurality of unique process identification data and wherein the plurality of columns comprise a plurality of instructions executable by respective processes identified by the plurality of unique process identification data.

8. The system of claim 7, wherein the plurality of instructions comprise a function, a method, a class, an object oriented object, or a combination thereof.

9. The system of claim 1, wherein the execution environment is configured to isolate execution of a program comprising a plurality of program instructions so that a crash of the program does not affect other systems included an AR system, a VR system or a combination thereof, and wherein the generative AI model is included in the AR system, the VR system, or the combination thereof.

10. The system of claim 9, wherein the execution environment is configured to disallow the execution of any one of the plurality of program instructions that accesses a memory address outside of a designated memory address range included in the predefined memory address range.

11. The system of claim 1, wherein the update package comprises computer instructions configured to update the generative AI model to a newer model version.

12. The system of claim 11, wherein the update package comprises computer instructions configured to update the sandbox system to a newer version.

13. The system of claim 12, wherein the secure network service is configured to verify a validity of the update package based on a secret key used to encrypt the update package.

14. The system of claim 1, comprising a display and rendering system operatively coupled to only the sandbox system and configured to display images based on data received only via the sandbox system.

15. The system of claim 1, wherein the secure data vault system is configured to generate a notification to a user when private information is detected and modified in the camera data.

16. The system of claim 1, wherein the interface is configured to authenticate access to the sandbox system and facilitate execution of instructions via the sandbox system.

17. The system of claim 1, wherein private information includes one or more of personal identification documents, biometric data, financial information, geolocation information, personal contact information, audio data containing private conversations, health information, confidential documents, and user-designated private content.

18. A method, comprising:
 storing, in a secure data vault system comprising a sandbox system, a generative AI model configured to generate outputs based on a training data set;
 providing an augmented reality (AR) system comprising a display and a camera;
 receiving camera data from the camera, via the secure data vault system;
 transmitting the camera data to the generative AI model that is processed by the generative AI model to generate output to display superimposed on real-world environment images, wherein the generative AI model is configured to modify sections containing private information, wherein in operation of the AR system, the camera only sends camera data to the sandbox system, wherein the sandbox system comprises an execution environment configured to restrict execution of the generative AI model to a predefined memory address range, wherein the execution environment verifies processes attempting to execute instructions based on process identification and a data store;
 authenticating, via secure network service communicatively coupled to the sandbox system, a connection to an external system;
 downloading from the external system an update package for the generative AI model when the connection is authenticated; and
 authenticating access to the sandbox system and facilitating execution of instructions via the sandbox system through an interface.

19. A non-transitory machine-readable medium storing instructions that, when executed by a computer system, cause the computer system to perform operations comprising:
 storing, in a secure data vault system comprising a sandbox system, a generative AI model configured to generate outputs based on a training data set;
 providing an augmented reality (AR) system comprising a display and a camera;
 receiving camera data from the camera, via the secure data vault system;
 transmitting the camera data to the generative AI model that is processed by the generative AI model to generate output to display superimposed on real-world environment images, wherein the generative AI model is configured to modify sections containing private information, wherein in operation of the AR system, the camera only sends camera data to the sandbox system, wherein the sandbox system comprises an execution environment configured to restrict execution of the generative AI model to a predefined memory address range, wherein the execution environment verifies processes attempting to execute instructions based on process identification and a data store;
 authenticating, via secure network service communicatively coupled to the sandbox system, a connection to an external system;
 downloading from the external system an update package for the generative AI model when the connection is authenticated; and
 authenticating access to the sandbox system and facilitating execution of instructions via the sandbox system through an interface.

\* \* \* \* \*